United States Patent [19]

Washimi et al.

[11] Patent Number: 5,324,329
[45] Date of Patent: Jun. 28, 1994

[54] REACTIVE DYE COMPOSITION AND DYEING OR PRINTING PROCESS USING THE SAME

[75] Inventors: Takeshi Washimi, Toyonaka; Naoki Harada, Ibaraki; Shuhei Hashizume, Osaka; Takashi Omura, Kobe, all of Japan

[73] Assignee: Sumitomo Chemical Company, Limited, Osaka, Japan

[21] Appl. No.: 76,962
[22] Filed: Jun. 16, 1993
[30] Foreign Application Priority Data Jun. 26, 1992 [JP] Japan .................................. 4-193234
[51] Int. Cl.$^5$ ............................................. C09B 62/00
[52] U.S. Cl. ................................. 8/543; 8/549; 8/641; 8/918
[58] Field of Search ............... 8/543, 549, 641, 918

[56] References Cited
U.S. PATENT DOCUMENTS 5,254,136 10/1993 Fujii et al. ........................... 8/549

FOREIGN PATENT DOCUMENTS 0052985 6/1982 European Pat. Off. .
0239847 10/1987 European Pat. Off. .
0525805 2/1993 European Pat. Off. .
4140541 2/1993 Fed. Rep. of Germany .
3188167 8/1991 Japan .

Primary Examiner—Paul Lieberman
Assistant Examiner—Margaret Einsmann
Attorney, Agent, or Firm—Stevens, Davis, Miller & Mosher

[57] ABSTRACT

A reactive dye composition containing at least one dye of the formula (I) in the free acid form:

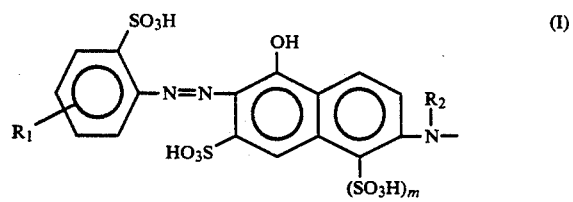

-continued

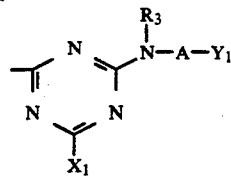

wherein m is zero or 1; $R_1$ is hydrogen, lower alkyl or lower alkoxy; $R_2$ and $R_3$ are independently hydrogen or substituted or unsubstituted lower alkyl; A is substituted or unsubstituted phenylene or naphthylene; $X_1$ is halogen, $-N(R_4)R_5$ or $-OR_6$ in which $R_4$, $R_5$ and $R_6$ are independently hydrogen or substituted or unsubstituted alkyl, phenyl or naphthyl; and $Y_1$ is the group $-SO_2CH=CH_2$ or the group $-SO_2CH_2CH_2Z_1$ in which $Z_1$ is a group splittable by the action of an alkali, and at least one dye of the formula (II) in the free acid form:

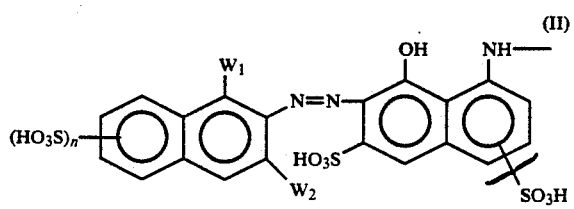

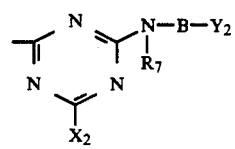

wherein n is zero, 1 or 2; one of $W_1$ and $W_2$ is hydrogen and the other is sulfo; $R_7$ is hydrogen or substituted or unsubstituted lower alkyl; B is substituted or unsubstituted phenylene or naphthylene; $X_2$ is $-N(R_8)R_9$, $-OR_{10}$ in which $R_8$, $R_9$ and $R_{10}$ are independently hydrogen or substituted or unsubstituted alkyl, phenyl, naphthyl, pyridinio, morpholino or piperidino; and $Y_2$ is the group $-SO_2CH=CH_2$ or the group $-SO_2CH_2CH_2Z_2$ in which $Z_2$ is a group splittable by the action of an alkali, dyes or prints cellulose fiber materials or fiber materials containing a cellulose fiber to give a vivid, deep and highly fast red color.

7 Claims, No Drawings

REACTIVE DYE COMPOSITION AND DYEING OR PRINTING PROCESS USING THE SAME

The present invention relates to a red reactive dye which permits highly reproducible, uniform, deep and fast dyeing and printing of fiber materials, in particular, cellulose fiber materials or fiber materials containing a cellulose fiber.

Water-soluble reactive dyes for dyeing and printing of cellulose fiber materials or fiber materials containing a cellulose fiber have been required to be excellent in various characteristics such as leveling properties, reproducibility of dyeing and printing, solubility, fastness, etc. Of the water-soluble reactive dyes, azo dyes are often used as red reactive dyes. Red reactive dyes are particularly required to be of high quality in their build-up properties, reproducibility in dyeing and printing, vivid hue performances, leveling properties and wash off properties. In addition, they are required to give dyed or printed products with improved color fastnesses to light, to perspiration and daylight, to chlorinated water, to chlorine in running water and to washing, and with a high stability over a long period of time.

However, dyeing or printing with commercially available red reactive dyes causes the following various problems. It is difficult to apply such commercially available red reactive dyes to various dyeing and printing treatments, since the uniformity and depth of color, the build-up properties and the reproducibility of the products dyed or printed with the commercially available dyes vary depending upon the conditions of the treatments and are not always satisfactory. The hue of the products dyed or printed with the commercially available dyes is not sufficiently vivid. The wash off properties of the products dyed or printed with the commercially available dyes are not sufficient. By the use of the commercially available dyes, it is difficult to obtain dyed or printed products that meet all the color fastness requirements such as those to light, to perspiration and daylight, to chlorinated water, to washing, etc. The stability over a long period of time of the products dyed or printed with the commercially available dyes is not sufficient.

The present inventors earnestly investigated in order to obtain a red dye which is excellent both in dye characteristics and in dyeing characteristics and is industrially advantageous. Consequently, the present inventors found that the object of the present invention can be achieved by blending two or more dyes having certain specific structures, respectively, whereby the present invention has been accomplished.

According to the present invention, there are provided a reactive dye composition which comprises:

at least one dye selected from the dyes represented by the formula (I) in the free acid form:

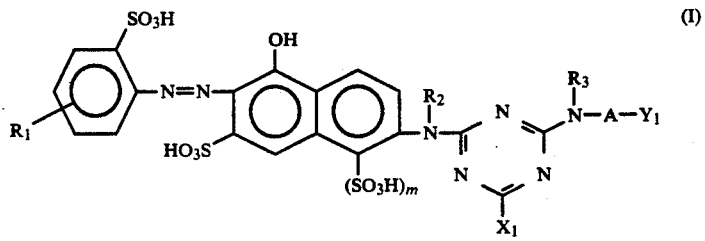

wherein m is zero or 1; $R_1$ is hydrogen, lower alkyl lower alkoxy; $R_2$ and $R_3$ are independently hydrogen or lower alkyl unsubstituted or substituted by hydroxyl, cyano, alkoxy, carboxy, carbamoyl, alkoxycarbonyl, alkylcarbonyloxy, sulfo, sulfamoyl or halogen; A is phenylene unsubstituted or substituted by one or two substituents selected from the group consisting of lower alkyl, lower alkoxy, sulfo and halogen, naphthylene or sulfonaphthylene; $X_1$ is halogen, $-N(R_4)R_5$ or $-OR_6$ in which $R_4$, $R_5$ and $R_6$ are independently hydrogen, alkyl unsubstituted or substituted by hydroxyl, cyano, alkoxy, carboxy, carbamoyl, alkoxycarbonyl, alkylcarbonyloxy, sulfo, sulfamoyl or halogen, phenyl unsubstituted or substituted by hydroxyl, cyano, alkoxy, carboxy, carbamoyl, alkoxycarbonyl, alkylcarbonyloxy, sulfo, sulfamoyl or halogen, or naphthyl unsubstituted or substituted by hydroxyl, cyano, alkoxy, carboxy, carbamoyl, alkoxycarbonyl, alkylcarbonyloxy, sulfo, sulfamoyl or halogen; and $Y_1$ is the group $-SO_2CH=CH_2$ or the group $-SO_2CH_2CH_xZ_1$ in which $Z_1$ is a group splittable by the action of an alkali, and at least one dye selected from the dyes represented by the formula (II) in the free acid form;

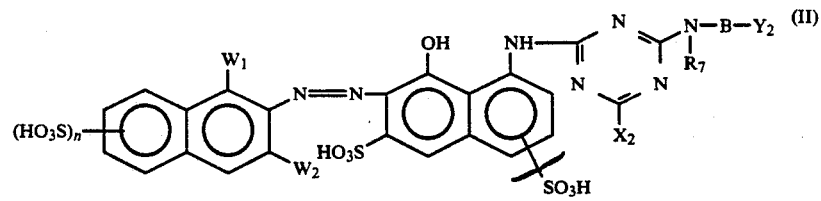

wherein n is zero, 1 or 2; one of $W_1$ and $W_2$ is hydrogen and the other is sulfo; $R_7$ is hydrogen or lower alkyl unsubstituted or substituted by hydroxyl, cyano, alkoxy, carboxy, carbamoyl, alkoxycarbonyl, alkylcarbonyloxy, sulfo, sulfamoyl or halogen; B is phenylene unsubstituted or substituted by one or two substituents selected from the group consisting of lower alkyl, lower alkoxy, sulfo and halogen, naphthylene or sulfonaphthylene; $X_2$ is $-N(R_8)R_9$, $-OR_{10}$ in which $R_8$, $R_9$ and $R_{10}$ are independently hydrogen, alkyl unsubstituted or substituted by hydroxyl, cyano, alkoxy, carboxy, carbamoyl, alkoxycarbonyl, alkylcarbonyloxy, sulfo, sulfamoyl or halogen, phenyl unsubstituted or substituted by hydroxyl, cyano, alkoxy, carboxy, carbamoyl, alkoxycarbonyl, alkylcarbonyloxy, sulfo, sulfamoyl or halogen, naphthyl unsubstituted or substituted by hydroxyl, cyano, alkoxy, carboxy, carbamoyl, alkoxycarbonyl, alkylcarbonyloxy, sulfo, sulfamoyl or halogen, substituted or unsubstituted pyridinio, substituted or unsubstituted morpholino, or substituted or unsubstituted piperidino; and $Y_2$ is the group $-SO_2CH=CH_2$ or the group $-SO_2CH_2CH_2Z_2$ in which $Z_2$ is a group splittable by the action of an alkali; and a process for dyeing or printing cellulose fiber materials or fiber materials containing a cellulose fiber.

For the lower alkyl or lower alkoxy represented by $R_1$ in the formula (I), methyl, ethyl, methoxy and ethoxy are preferable.

Specific examples of the atom or group represented by each of $R_2$, $R_3$ and $R_7$ in the formulas (I) and (II) are hydrogen, methyl, ethyl, n-propyl, isopropyl, n-butyl, isobutyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyetyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, 2-methylcarbonyloxyethyl, 2-ethylcarbonyloxyethyl, 3-methylcarbonyloxypropyl, 3-ethylcarbonyloxypropyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl, and 4-sulfamoylbutyl. In particular, hydrogen, methyl and ethyl are preferable.

In the formula (I), when $X_1$ is $-N(R_4)R_5$, the substituted or unsubstituted alkyl represented by each of $R_4$ and $R_5$ are preferably alkyl having 1 to 4 carbon atoms which may be substituted by one or two substituents selected from the group consisting of alkoxy having 1 to 4 carbon atoms, sulfo, carboxy, hydroxyl, chlorine, phenyl and sulfato. Particularly preferably, the substituted or unsubstituted alkyl group are methyl, ethyl, n-propyl, isopropyl, n-butyl, isobutyl, sec-butyl, $\beta$-hydroxyethyl, $\beta$-sulfatoethyl, $\beta$-sulfoethyl, $\beta$-methoxyethyl and $\beta$-carboxyethyl.

The substituted or unsubstituted phenyl represented by each of $R_4$ and $R_5$ are preferably phenyl which may be substituted by one or two substituents selected from the group consisting of alkyl having 1 to 4 carbon atoms, alkoxy having 1 to 4 carbon atoms, carboxy and chlorine. Particularly preferably, the substituted or unsubstituted phenyl are phenyl, 2-, 3- or 4-sulfophenyl, 2-, 3- or 4-chlorophenyl, 2-, 3- or 4-methylphenyl and 2-, 3- or 4-methoxyphenyl.

The substituted or unsubstituted naphthyl represented by each of $R_4$ and $R_5$ are preferably naphthyl which may be substituted by one, two or three substituents selected from the group consisting of hydroxyl, carboxy, sulfo, alkyl having 1 to 4 carbon atoms, alkoxy having 1 to 4 carbon atoms, and chlorine. Particularly preferably, the substituted or unsubstituted naphthyl are 2-, 3-, 4-, 5-, 6-, 7- or 8-sulfo-1-naphthyl, 1-, 5-, 6-, 7- or 8-sulfonaphthyl, 5,7-, 6,8-, 4,8-, 4,7-, 3,8-, 4,6- 3,7- or 3,6-disulfo-2-naphthyl, 4,6,8-, 2,4,7- or 3,6,8-trisulfo-1-naphthyl, and 1,5,7-, 4,6,8- or 3,6,8-trisulfo-2-naphthyl. Of these, 6-sulfo-1-naphthyl is most preferable.

In the formula (I), when $X_1$ is $-OR_6$ and $R_6$ is substituted or unsubstituted alkyl, $X_1$ is preferably alkoxy having 1 to 4 carbon atoms. Specific examples of such alkoxy are methoxy, ethoxy, n-propoxy, isopropoxy, n-butoxy, $\beta$-methoxyethoxy, and isobutoxy. Of these, methoxy and ethoxy are particularly preferable.

When $X_1$ is $-OR_6$ and $R_6$ is substituted or unsubstituted phenyl or naphthyl, $X_1$ are preferably phenoxy which may be substituted by one or two substituents selected from the group consisting of alkyl having 1 to 4 carbon atoms, alkoxy having 1 to 4 carbon atoms, nitro, sulfo, carboxy and chlorine, or naphthoxy which may be substituted by one or two substituents selected from the group consisting of alkyl having 1 to 4 carbon atoms, alkoxy having 1 to 4 carbon atoms, nitro, sulfo, carboxy and chlorine. Particularly preferably, $X_1$ are 2-, 3- or 4-chlorophenoxy or 2-, 3- or 4-methoxyphenoxy.

In the formula (II), when $X_2$ is $-N(R_8)R_9$, the substituted or unsubstituted alkyl represented by each of $R_8$ and $R_9$ are preferably alkyl having 1 to 4 carbon atoms which may be substituted by one or two substituents selected from the group consisting of alkoxy having 1 to 4 carbon atoms, sulfo, carboxy, hydroxyl, chlorine, phenyl and sulfato. Particularly preferably, the substituted or unsubstituted alkyl are methyl, ethyl, n-propyl, isopropyl, n-butyl, isobutyl, sec-butyl, $\beta$-hydroxyethyl, $\beta$-sulfatoethyl, $\beta$-sulfoethyl, $\beta$-methoxyethyl and $\beta$-carboxyethyl.

The substituted or unsubstituted phenyl represented by each of $R_8$ and $R_9$ are preferably phenyl which may be substituted by one or two substituents selected from the group consisting of alkyl having 1 to 4 carbon atoms, alkoxy having 1 to 4 carbon atoms, carboxy and chlorine. Particularly preferably, the substituted or unsubstituted phenyl are phenyl, 2-, 3- or 4-sulfophenyl, 2, 3- or 4-chlorophenyl, 2-, 3- or 4-methylphenyl, and 2-, 3- or 4-methoxyphenyl.

The substituted or unsubstituted naphthyl represented by each of $R_8$ and $R_9$ are preferably naphthyl which may be substituted by one, two or three substituents selected from the group consisting of hydroxyl, carboxy, sulfo, alkyl having 1 to 4 carbon atoms, alkoxy having 1 to 4 carbon, and chlorine. Particularly preferably, the substituted or un-substituted naphthyl are 2-, 3-, 4-, 5-, 6-, 7- or 8-sulfo-1-naphthyl, 1-, 5-, 6-, 7- or 8-sulfonaphthyl, 5,7-, 6,8-, 4,8-, 4,7-, 3,8-, 4,6-, 3,7- or 3,6-disulfo-2-naphthyl, 4,6,8-, 2,4,7- or 3,6,8-trisulfo-1-naphthyl, and 1,5,7-, 4,6,8- or 3,6,8-trisulfo-2-naphthyl. Of these, 6-sulfo-1-naphthyl is most preferable.

In the formula (II), when $X_2$ is $-OR_{10}$ and $R_{10}$ is substituted or unsubstituted alkyl, $X_2$ is preferably alkoxy having 1 to 4 carbon atoms. Specific examples of such alkoxy are methoxy, ethoxy, n-propoxy, isopropoxy, n-butoxy, $\beta$-methoxyethoxy, and isobutoxy. Of these, methoxy and ethoxy are particularly preferable.

When $X_2$ is $-OR_{10}$ and $_{10}$ is substituted or unsubstituted phenyl or naphthyl, $X_2$ is preferably phenoxy which may be substituted by one or two substituents selected from the group consisting of alkyl having 1 to 4 carbon atoms, alkoxy having 1 to 4 carbon atoms, nitro, sulfo, carboxy and chlorine, or naphthoxy which may be substituted by one or two substituents selected from the group consisting of alkyl having 1 to 4 carbon atoms, alkoxy having 1 to 4 carbon atoms, nitro, sulfo, carboxy and chlorine. Particularly preferably, $X_2$ is 2-, 3- or 4-chlorophenoxy or 2-, 3- or 4-methoxyphenoxy.

In the formula (II), when $X_2$ is substituted or unsubstituted pyridinio, $X_2$ is preferably pyridine, nicotinic acid, isonicotinic acid, nicotinic acid amide, isonicotinic acid amide and p-methylpyridine residues. Of these, nicotinic acid, isonicotinic acid, nicotinic acid amide and isonicotinic acid amide residues are particularly preferable.

In the formula (II), when $X_2$ is morpholino or piperidino, $X_2$ is preferably:

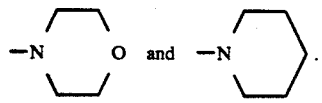

In the present invention, the phenylene, naphthylene or sulfonaphthylene represented by each of A and B in the formula (I) and (II) is preferably phenylene which may be substituted by one or two substituents selected from the group consisting of methyl, ethyl, methoxy, ethoxy, chlorine, bromine, sulfo, naphtylene and sulfonaphthylene. Specific examples of the phenylene, naphthylene or sulfonaphythylene are as follows:

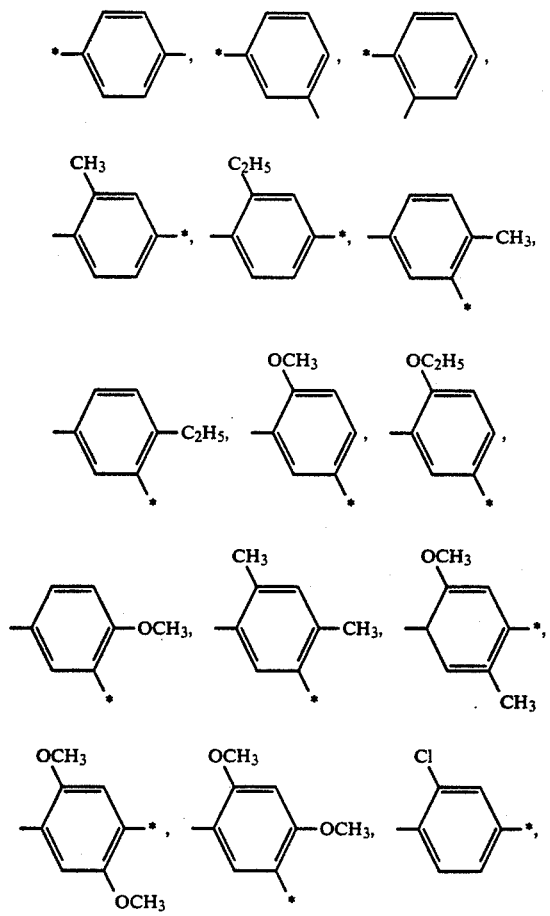

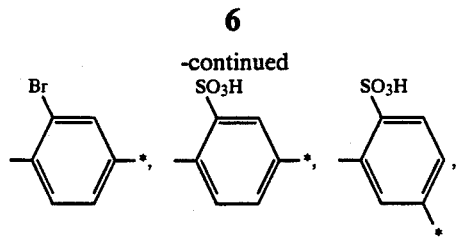

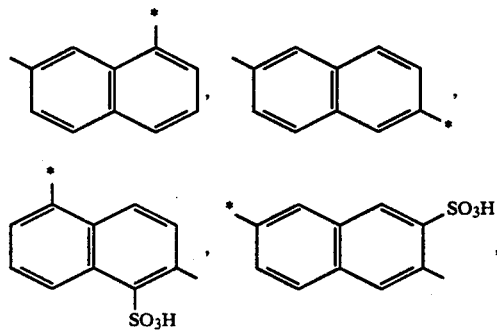

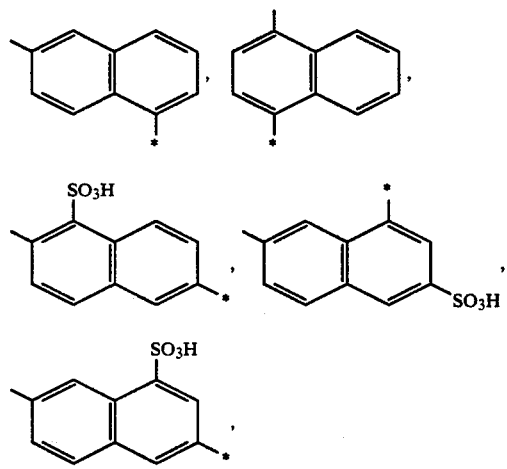

wherein the bonds marked with the asterisk are for binding to $—Y_1$ or $—Y_2$.

In the formulas (I) and (II), when $Y_1$ and $Y_2$ are $—SO_2CH_2CH_2Z_1$ and $—SO_2CH_2CH_2Z_2$, respectively, the group splittable by the action of an alkali which is represented by each of $Z_1$ and $Z_2$ includes, for example, sulfate ester groups, thiosulfate ester groups, phosphate ester groups, acetate ester groups, and halogen atoms.

The dye represented by the formula (I) can be produced by a conventional process, for example, any of the processes disclosed in JP-A-57-89679, JP-A-60-6754 and JP-A-58-191755.

The dye represented by the formula (II) can be produced, for example, in the following manner.

A diazonium salt obtained by diazotizing a compound represented by the formula (VI) in the free acid form:

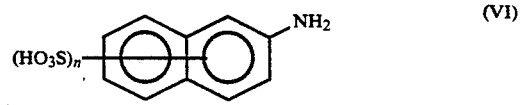

(VI)

wherein n is as defined above, by a conventional method is coupled with a compound represented by the formula (V) in the free acid form:

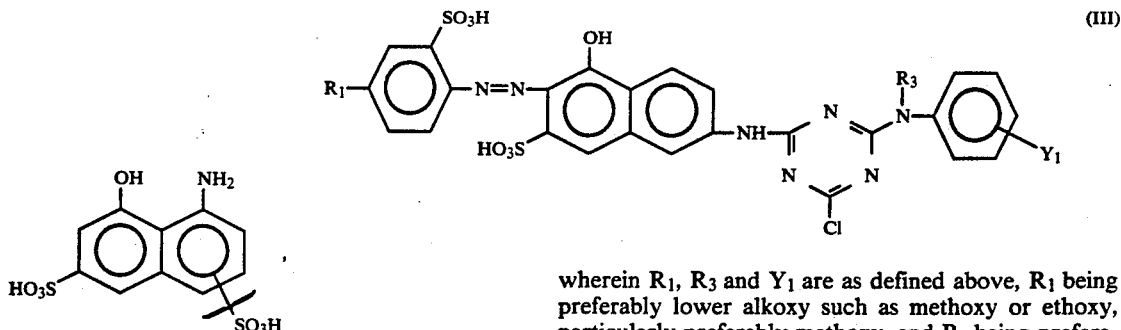

(III)

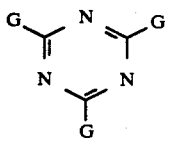

to obtain a monoazo compound. The monoazo compound thus obtained, 2,4,6-trihalogeno-1,3,5-triazine of the formula (VII):

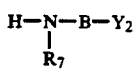

wherein G is halogen,
a compound of the formula (VIII):

   (VIII)

wherein $R_7$, B and $Y_2$ are as defined above, and
a compound of the formula (IX):

H—$X_2$   (IX)

wherein $X_2$ is as defined above, are condensed with one another in an optional order in an aqueous medium at a temperature of −10° C. to +50° C. at a pH of 1 to 10 in the first stage, at a temperature of 0° C. to +70° C. at a pH of 2 to 9 in the second stage, and at a temperature of 50° C. to 100° C. at a pH of 2 to 9 in the third stage. Thus, the dye represented by the formula (II) can be obtained.

In the present invention, each of the dyes of the formulas (I) and (II) exists in the form of a free acid or the salt thereof. As the salt, alkali metal salts and alkaline earth metal salts, in particular, sodium salt, potassium salt and lithium salt are preferable.

Among those represented by the formula (I), particularly preferable is a dye represented by the formula (III) in the free acid form:

wherein $R_1$, $R_3$ and $Y_1$ are as defined above, $R_1$ being preferably lower alkoxy such as methoxy or ethoxy, particularly preferably methoxy, and $R_3$ being preferably hydrogen, methyl or ethyl, particularly preferably ethyl.

Among those represented by the formula (II), particularly preferably is a dye represented by the formula (IV) in the free acid form:

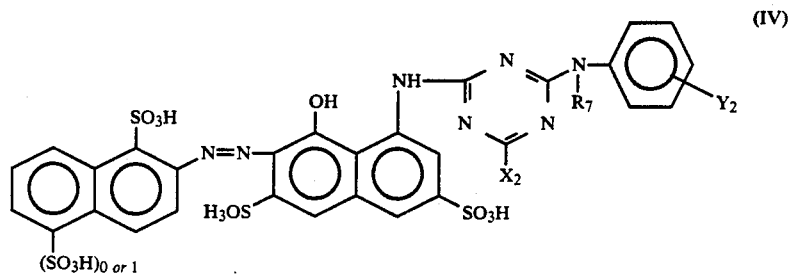

wherein $R_7$, $X_2$ and $Y_2$ are as defined above, $R_7$ being preferably hydrogen, methyl or ethyl, particularly preferably hydrogen, and $X_2$ being preferably morpholino or piperidino, particularly preferably morpholino.

In preparing the reactive dye composition of the present invention, one or more dyes selected from those represented by the formula (II) can be mixed in an amount of 0.05 to 100 times by weight, preferably 0.1 to 50 times by weight, more preferably 0.2 to 20 times by weight, the amount of one or more dyes selected from those represented by the formula (I).

The method for mixing the reactive dyes is not particularly limited in the present invention. The reactive dyes may be previously mixed before being used for dyeing, or they may be mixed at the time of dyeing.

If necessary, the reactive dye composition of the present invention can be used in admixture with other dyes in order to attain a desired hue. The dyes used in combination with the dye composition of the present invention are not particularly limited. As these dyes, well-known reactive dyes can be used. Specific examples of such dyes are those described in JP-A-50-178, JP-A-56-9483, JP-A-56-15481, JP-A-56-118976, JP-A-56-128380, JP-A-57-2365, JP-A-57-143360, JP-A-59-15451, JP-A-59-96174, JP-A-59-161463, JP-A-60-123559, JP-A-60-229957, JP-A-60-260654, JP-A-61-155469, JP-A-63-77974, JP-A-63-225665, JP-A-1-185370 and JP-A-3-770, and those which are on the market by series names such as Sumifix dyes, Sumifix Supra dyes, Remazol dyes, Levafix dyes, etc.

If necessary, the reactive dye composition of the present invention may contain inorganic salts (e.g. anhydrous sodium sulfate and sodium chloride), dispersants, dust-scattering preventing agents, pH stabilizers, water softeners (e.g. polyphosphates), well-known dyeing assistants, etc.

The form of the reactive dye composition of the present invention is not critical and may be a well-known form. The reactive dye composition may be powdery, granular or liquid.

The cellulose fiber materials used in the process of the present invention are not particularly limited. Specific examples of the cellulose fiber materials are natural and regenerated cellulose fibers (e.g. cotton, linen, flax, jute, ramie fiber, viscose rayon silk, and Bemberg). Specific examples of the fiber materials containing a cellulose fiber are cotton-polyester mix spinning products, cotton-nylon mix spinning products, and cotton-wool mix spinning products.

As a dyeing or printing method employed in the process of the present invention, a conventional method may be employed. As an exhaustion dyeing method, there can be exemplified a method in which dyeing is conducted using well-known inorganic neutral salts (e.g. anhydrous sodium sulfate and sodium chloride) and well-known acid-binding agents (e.g. sodium carbonate, sodium hydrogen-carbonate, sodium hydroxide and sodium tertiary phosphate) singly or in combination of two or more thereof. Dyeing assistants usable in this case are not limited thereto. Although not critical, the inorganic neutral salts and acid-binding agents are preferably used in an amount of at least 1 g/liter. They may be used in an amount of 100 g/liter or more, but in the present invention, dyeing can be sufficiently conducted even when they are used in an amount as small as 50 g/liter or less. The inorganic neutral salts and the acid-binding agents may be put in a dye bath all at once, or they may be put therein in several times by a conventional method. Dyeing assistants such as leveling agents, retarding agents, in-bath softeners and the like may be used together with the inorganic neutral salts and the acid-binding agents by a conventional method. Dyeing assistants usable together with these salts and agents are not particularly limited thereto. The dyeing temperature is usually within the range of from 40° to 90° C., preferably within the range of from 40°-70° C. As a cold batch-up dyeing method, there can be exemplified a method comprising conducting padding of a material to be dyed using a well-known inorganic neutral salt (e.g. anhydrous sodium sulfate or sodium chloride) and a well-known acid-binding agent (e.g. sodium hydroxide or sodium silicate) and allowing the resulting material to stand in a closed wrapping material at a prescribed temperature, whereby dyeing is conducted. As continuous dyeing methods, there can be exemplified a one-bath padding method which comprises mixing a well-known acid-binding agent (e.g. sodium carbonate or sodium hydrogencarbonate) with a dye padding liquid, carrying out padding of a material to be dyed by a conventional method, and then dyeing the resulting material by dry heating or steaming; and a two-bath padding method which comprises carrying out padding of a material to be dyed with a dye and then with a well-known inorganic neutral salt (e.g. anhydrous sodium sulfate or sodium chloride) and a well-known acid-binding agent (e.g. sodium hydroxide or sodium silicate), and dyeing the thus treated material by dry heating or steaming by a conventional method. As textile printing methods, there can be exemplified a one-phase printing method which comprises conducting printing of a material to be printed with a printing paste containing a well-known acid-binding agent (e.g. sodium hydrogencarbonate), and completing the printing of the material by dry heating or steaming; and two-phase printing method which comprises conducting printing of a material to be printed with a printing paste, and completing the printing of the resulting material by putting it in a solution containing an inorganic neutral salt (e.g. sodium chloride) and a well-known acid-binding agent (e.g. sodium hydroxide or sodium silicate) at an elevated temperature of 90° C. or higher. The dyeing or printing method employed in the process of the present invention is not limited to these methods.

The reactive dye composition of the present invention exhibits the following advantageous dye characteristics and dyeing characteristics.

The reactive dye composition of the present invention is excellent in color yield, build-up properties, reproducibility of dyeing and printing, leveling properties and wash off properties. It gives dyed or printed products of vivid hue which are excellent in various color fastness properties such as color fastness to light, to perspiration and daylight, to chlorinated water, to washing, to running water, and to washing. Moreover, the products dyed or printed with the reactive dye composition of the present invention shows a good stability over a long period of time. Furthermore, the reactive dye composition of the present invention has a good solubility and is hardly affected by the changes of the dyeing conditions such as dyeing temperature, dye bath ratio and the amount of an inorganic acid used, whereby it always gives dyed or printed products of high quality.

The present invention is illustrated below in further detail with the following examples, which should not be construed as limiting the scope of the invention. In the examples, parts and percents are all by weight.

REFERENTIAL EXAMPLE

The compound of the formula (6) used in Example 1 can be produced in the following manner.

31.9 Parts of a compound of the formula (1),

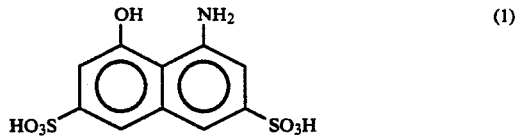

is condensed with 18.5 parts of s-trichloro-1,3,5-triazine in an aqueous medium under an acidic condition by a conventional method to obtain a condensation product. A diazonium compound obtained by diazotizing 22.3 parts of a compound of the formula (2),

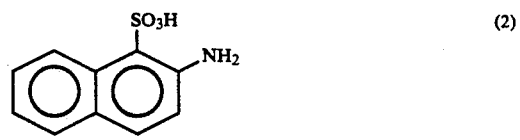

by a conventional method is coupled with the condensation product obtained in the above, by a conventional method to obtain a monoazo compound. The monoazo compound thus obtained, 28.1 parts of a compound of the formula (3),

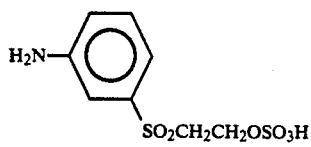
(3)

and 8.0 parts of morpholine of the formula (4),

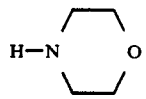
(4)

are condensed as follows. First, the monoazo compound is condensed with morpholine at a pH of 7-8 and a temperature of 20°-30° C. to obtain a condensation product. Thereafter, the compound of the formula (4) is condensed with the condensation product to obtain a reactive dye of the formula (6). dye of the formula (6).

Of the dyes used in Examples 2 to 25, the dyes of the formula (II) can be prepared by repeating the same procedure as in the above referential example except that the compounds of the formulas (1), (2), (3) and (4) described in the above referential example are replaced by the compounds listed in the 2nd, 3rd, 4th and 5th columns in the following tables, respectively.

TABLE 1

| Dye No. | 2nd column | 3rd column | 4th column | 5th column |
|---|---|---|---|---|
| 8 | OH NH$_2$ / HO$_3$S—[naphthalene]—SO$_3$H | SO$_3$H / [naphthalene]—NH$_2$ | H$_2$N—[benzene]—SO$_2$CH$_2$CH$_2$OSO$_3$H | H$_2$N—[benzene]—SO$_3$H |
| 10 | OH NH$_2$ / HO$_3$S—[naphthalene]—SO$_3$H | SO$_3$H / [naphthalene]—NH$_2$ / HO$_3$S | H$_2$N—[benzene]—SO$_2$CH=CH$_2$ | H$_2$N—[benzene] |
| 12 | OH NH$_2$ / HO$_3$S—[naphthalene]—SO$_3$H | SO$_3$H / [naphthalene]—NH$_2$ | C$_2$H$_5$ / HN—[benzene]—SO$_2$CH$_2$CH$_2$OSO$_3$H | H$_2$N—[benzene]—COOH |
| 13 | OH NH$_2$ / HO$_3$S—[naphthalene]—SO$_3$H | SO$_3$H / [naphthalene]—NH$_2$ / HO$_3$S | SO$_2$CH$_2$CH$_2$OSO$_3$H / H$_2$N—[benzene]—OCH$_3$ | H$_2$NCH$_2$CH$_2$OH |

TABLE 2

| Dye No. | 2nd column | 3rd column | 4th column | 5th column |
|---|---|---|---|---|
| 14 | OH NH$_2$ / HO$_3$S—[naphthalene]—SO$_3$H | SO$_3$H / [naphthalene]—NH$_2$ | CH$_3$ / H$_2$N—[benzene]—SO$_2$CH$_2$CH$_2$OSO$_3$H / OCH$_3$ | CH$_3$ / HO—[benzene] |
| 15 | OH NH$_2$ / HO$_3$S—[naphthalene]—SO$_3$H | SO$_3$H / [naphthalene]—NH$_2$ / HO$_3$S | H$_2$N—[benzene]—SO$_2$CH$_2$CH$_2$OSO$_3$H | N—[pyridine]—COOH |
| 17 | OH NH$_2$ / HO$_3$S—[naphthalene]—SO$_3$H | SO$_3$H / [naphthalene]—NH$_2$ / SO$_3$H | H$_2$N—[benzene]—OCH$_3$ / SO$_2$CH$_2$CH$_2$OSO$_3$H | H$_2$N—[benzene]—COOH |
| 19 | OH NH$_2$ / HO$_3$S—[naphthalene]—SO$_3$H | SO$_3$H / [naphthalene]—NH$_2$ | CH$_3$ / HN—[benzene]—SO$_2$CH$_2$CH$_2$OSO$_3$H | H$_2$N—[benzene]—CH$_3$ |

TABLE 3

| Dye No. | 2nd column | 3rd column | 4th column | 5th column |
|---|---|---|---|---|
| 20 | 1-OH, 8-NH$_2$, 3,6-di(SO$_3$H) naphthalene | 1-SO$_3$H, 2-NH$_2$ naphthalene | 2-OCH$_3$, 5-(SO$_2$CH$_2$CH$_2$OSO$_3$H), N-methylaniline (HN-CH$_3$) | morpholine (H—N⟨O⟩) |
| 23 | 1-OH, 8-NH$_2$, 3,6-di(SO$_3$H) naphthalene | 1,5-di(SO$_3$H), 2-NH$_2$ naphthalene | H$_2$N—C$_6$H$_4$—SO$_2$CH$_2$CH$_2$OSO$_3$H | 2-methoxyaniline (H$_2$N—C$_6$H$_4$—OCH$_3$) |
| 24 | 1-OH, 8-NH$_2$, 3,6-di(SO$_3$H) naphthalene | 1-SO$_3$H, 2-NH$_2$ naphthalene | 2-OCH$_3$, 4-CH$_3$, 5-(SO$_2$CH$_2$CH$_2$OSO$_3$H) aniline | H$_2$NCH$_2$CH$_2$SO$_3$H |
| 25 | 1-OH, 8-NH$_2$, 3,6-di(SO$_3$H) naphthalene | 1-SO$_3$H, 2-NH$_2$ naphthalene | H$_2$N—C$_6$H$_4$—SO$_2$CH$_2$CH$_2$OSO$_3$H | H$_2$N—C$_6$H$_4$—COOH |

TABLE 4

| Dye No. | 2nd column | 3rd column | 4th column | 5th column |
|---|---|---|---|---|
| 26 | 1-OH, 8-NH$_2$, 3,6-di(SO$_3$H) naphthalene | 1,5-di(SO$_3$H), 2-NH$_2$ naphthalene | 1-NH$_2$, 2-OCH$_3$, 5-(SO$_2$CH$_2$CH$_2$OSO$_3$H) benzene | H$_2$NCH$_2$CH$_2$SO$_3$H |
| 27 | 1-OH, 8-NH$_2$, 3,6-di(SO$_3$H) naphthalene | 1,5-di(SO$_3$H), 2-NH$_2$ naphthalene | 1-NH$_2$, 2-OCH$_3$, 5-(SO$_2$CH$_2$CH$_2$OSO$_3$H) benzene | 2-methylphenol (HO—C$_6$H$_4$—CH$_3$) |
| 28 | 1-OH, 8-NH$_2$, 3,6-di(SO$_3$H) naphthalene | 1-SO$_3$H, 2-NH$_2$ naphthalene | H$_2$N—C$_6$H$_4$—SO$_2$CH$_2$CH$_2$OSO$_3$H | H$_2$N—C$_6$H$_4$—CH$_3$ |
| 29, 30 | 1-OH, 8-NH$_2$, 3,6-di(SO$_3$H) naphthalene | 1-SO$_3$H, 2-NH$_2$ naphthalene | 1-NH$_2$, 2-OCH$_3$, 5-(SO$_2$CH$_2$CH$_2$OSO$_3$H) benzene; and 1-NH$_2$, 2-OCH$_3$, 5-(SO$_2$CH=CH$_2$) benzene | HN(C$_2$H$_4$OH)$_2$ |

TABLE 5

| Dye No. | 2nd column | 3rd column | 4th column | 5th column |
|---|---|---|---|---|
| 31 | 1-OH, 8-NH$_2$, 3,6-di(SO$_3$H) naphthalene | 1,5-di(SO$_3$H), 2-NH$_2$ naphthalene | H$_2$N—C$_6$H$_4$—SO$_2$CH=CH$_2$ | hexamethyleneimine (H—N⟨(CH$_2$)$_6$⟩) |

TABLE 5-continued

| Dye No. | 2nd column | 3rd column | 4th column | 5th column |
|---|---|---|---|---|
| 32, 33 | 1-OH, 8-NH₂, 3,6-di(SO₃H), naphthalene (HO₃S at 3, SO₃H at 6) — 1-hydroxy-8-amino-3,6-disulfonaphthalene | 2-amino-1-sulfonaphthalene | H₂N—C₆H₄—SO₂CH₂CH₂OSO₃H ; H₂N—C₆H₄—SO₂CH=CH₂ | H₂N—C₆H₄—SO₃H |
| 34 | 1-OH, 8-NH₂, 3,6-di(SO₃H)-naphthalene | 2-amino-1-sulfonaphthalene | H₂N—C₆H₃(OCH₃)—SO₂CH₂CH₂OSO₃H | H₂N—C₆H₄—SO₃H |
| 35 | 1-OH, 8-NH₂, 3,6-di(SO₃H)-naphthalene | 2-amino-1,5-disulfonaphthalene | H₂N—C₆H₄—SO₂CH₂CH₂OSO₃H | HO—C₆H₄—CH₃ |

TABLE 6

| Dye No. | 2nd column | 3rd column | 4th column | 5th column |
|---|---|---|---|---|
| 36 | 1-OH, 8-NH₂, 3,6-di(SO₃H)-naphthalene | 2-amino-1,5-disulfonaphthalene | CH₃—N(H)—C₆H₄—SO₂CH₂CH₂OSO₃H | H₂N—C₆H₄—SO₃H |
| 37 | 1-OH, 8-NH₂, 3,6-di(SO₃H)-naphthalene | 2-amino-1-sulfonaphthalene | H₂N—C₆H₄—SO₂CH₂CH₂OSO₃H | 3-pyridyl—COOH |
| 38 | 1-OH, 8-NH₂, 3,6-di(SO₃H)-naphthalene | 2-amino-1,5-disulfonaphthalene | H₂N—C₆H₄—SO₂CH₂CH₂OSO₃H | H₂NCH₂CH₂CH₃ |
| 39 | 1-OH, 8-NH₂, 3,6-di(SO₃H)-naphthalene | 2-amino-1-sulfonaphthalene | C₂H₅—N(H)—C₆H₄—SO₂CH=CH₂ | H₂N—C₆H₃(CH₃)₂ (2,3-dimethyl) |

EXAMPLE 1

In a wince dyeing apparatus was set 100 kg of a knitted cotton fabric. The bath ratio was adjusted to 1:15 and the water bath temperature to 60° C.

100 Parts of a dye represented by the formula (5) in the free acid form:

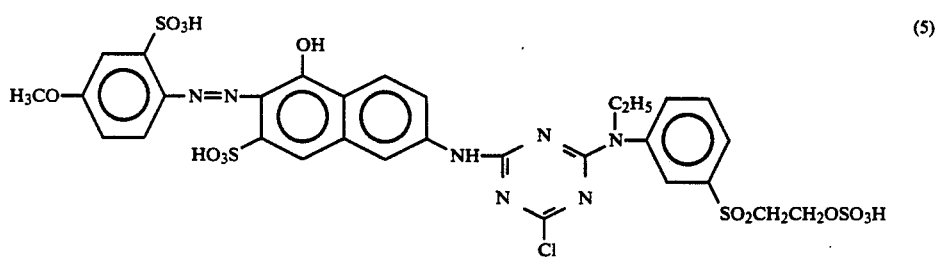

(5)

was thoroughly mixed with 900 parts of a dye represented by the formula (6) in the free acid form:

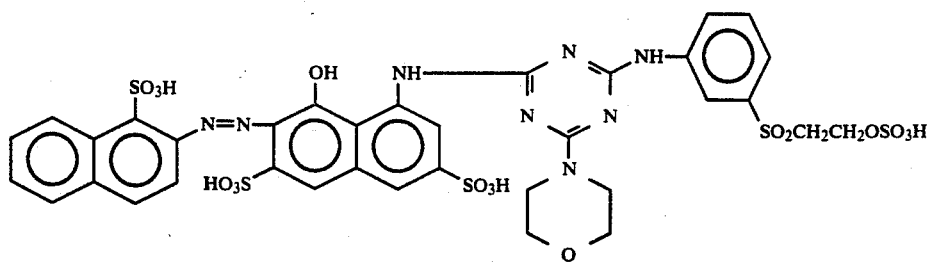

(6)

to obtain a dye composition. 6 Kilograms of the resulting dye composition was dissolved in water with a conventional method. The resulting solution was poured into the bath of the apparatus. The bath temperature was maintained at 60° C. Then, 150 kg of anhydrous sodium sulfate was put in the bath in a conventional manner. The knitted cotton fabric was treated in the bath at this temperature for 20 minutes. Thereafter, 30 kg of sodium carbonate was put in the bath by a conventional manner. Subsequently, the knitted cotton fabric was treated at the temperature for 60 minutes to complete the dyeing. The resulting dyed fabric was finished by washing by a conventional method. The dyed fabric thus finished had a mottle-free, uniform, vivid and deep red color. It showed high color fastnesses to light, to perspiration and daylight, to chlorinated water, to chlorine in running water and to washing. It was stable over a long period of time. In particular, it exhibited outstandingly high color fastness to perspiration and daylight and color yield. The highly improved color yield showed the existence of synergistic effect by the blending of the dyes.

EXAMPLE 2

In a low-bath-ratio type liquor flow dyeing apparatus was set 100 kg of a knitted fabric made of rayon fiber. The bath ratio was adjusted to 1:6 and the water bath temperature to 65° C. 200 Parts of a dye represented by the formula (7) in the free acid form:

was thoroughly mixed with 800 parts of a dye represented by the formula (8) in the free acid form:

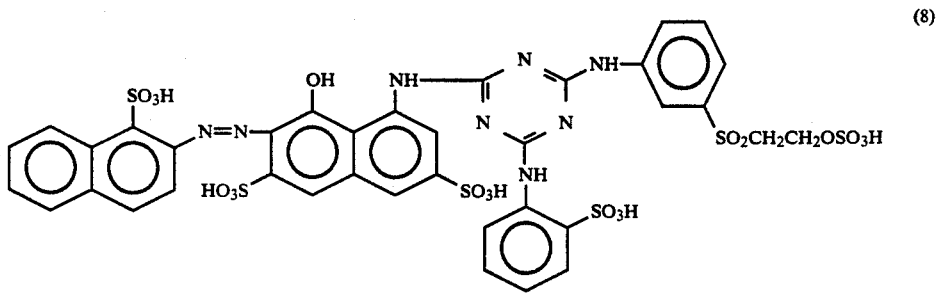

(8)

to obtain a dye composition. 6 Kilograms of the resulting dye composition was dissolved in water by a conventional method. The resulting solution was poured into the bath of the apparatus. The bath temperature was maintained at 65° C. Then, 40 kg of anhydrous sodium sulfate was put in the bath in a conventional manner. The knitted fabric was treated in the bath at this temperature for 20 minutes. Thereafter, 6 kg of sodium carbonate was put in the bath in a conventional manner. Subsequently, the knitted fabric was treated at the temperature for 60 minutes to complete the dyeing. The resulting dyed fabric was finished by washing in a conventional manner. The dyed fabric thus finished had a mottle-free, uniform and deep red color. It showed high color fastnesses to light, to perspiration and daylight, to chlorinated water, to chlorine in running water and to washing. It was stable over a long period of time. In particular, it exhibited outstandingly high color fastness to perspiration and daylight and color yield. The highly improved color yield showed the existence of synergistic effect by the blending of the dyes.

EXAMPLE 3

In a cheese dyeing apparatus was set 100 kg of cotton yarn in the form of a cheese. The bath ratio was adjusted to 1:10 and the water bath temperature to 65° C. 0.7 Kilogram of a dye represented by the formula (9) in the free acid form:

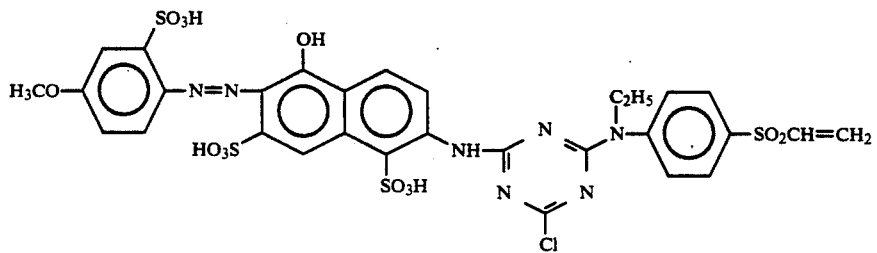

(7)

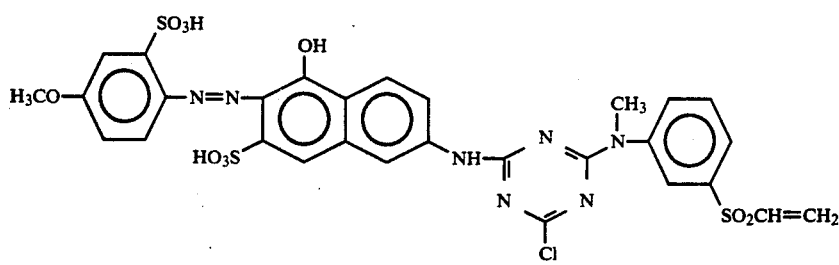

was thoroughly mixed with 6.3 kg of a dye represented by the formula (10) in the free acid form:

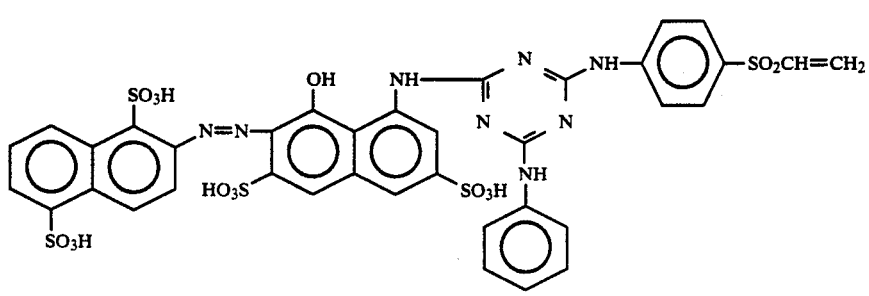

to obtain a dye composition. 7 Kilograms of the resulting dye composition was dissolved in water by a conventional method. The resulting solution was poured into the bath of the apparatus. The bath temperature was maintained at 65° C. Then, 50 kg of sodium chloride was put in the bath in a conventional manner. The yarn was treated in the bath at this temperature for 30 minutes. Thereafter, 10 kg of sodium tertiary phosphate was put in the bath in a conventional manner. Subsequently, the yarn was treated at the temperature for 60 minutes to complete the dyeing. The resulting dyed yarn was finished by washing in a conventional manner. The dyed yarn thus finished had a uniform and deep red color without any difference in depth of color between the inside and outside layers of the cheese. It showed high color fastnesses to light, to perspiration and daylight, to chlorinated water, to chlorine in running water and to washing. It was stable over a long period of time.

In particular, it exhibited a high color fastness to perspiration and daylight and color yield. The highly improved color yield showed the existence of synergistic effect by the blending of the dyes.

EXAMPLE 4

In a high-pressure type liquor flow dyeing apparatus was set 200 kg of a knitted mixed fabric composed of 50% of a cotton fiber and 50% of a polyester fiber. The bath ratio was adjusted to 1:10 and the water bath temperature to 80° C. The pH was adjusted to 5 with acetic acid. A dispersion prepared by uniformly dispersing 2.0 kg of a disperse dye of the formula (11):

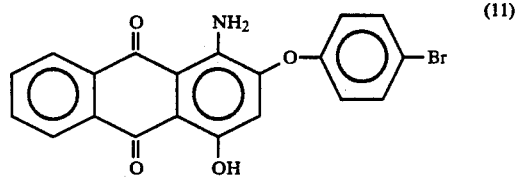

and 2 kg of a dispersant Sumipon TF (mfd. by Sumitomo Chemical Co., Ltd.) in water was poured into the bath of the apparatus. Thereafter, the temperature was raised to 130° C. over a period of 40 minutes. Keeping at this temperature, the polyester in the mixed fabric was dyed in the bath for 40 minutes. Then, the dye liquor was discharged. Thereafter, water was supplied to the bath to adjust the bath ratio to 1:10, and the bath temperature was adjusted to 60° C. 100 Parts of the dye represented by the formula (5) in the free acid form was thoroughly mixed with 900 parts of a dye represented by the formula (12) in the free acid form:

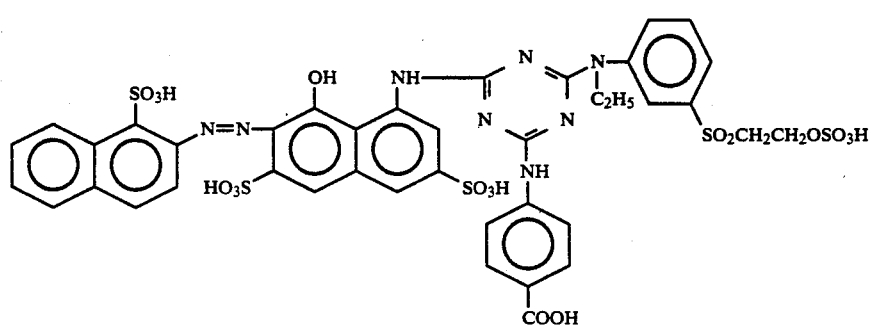

to obtain a dye composition. 2.4 Kilograms of the resulting dye composition was dissolved in water in a conventional manner. The resulting solution was poured into the bath of the apparatus, and the bath temperature was maintained at 60° C. Then, 80 kg of anhydrous sodium sulfate was put in the bath in a conventional manner. The knitted fabric was treated in the bath at this temperature for 20 minutes. Thereafter, 30 kg of sodium carbonate was put in the bath in a conventional manner. Subsequently, the knitted fabric was treated at the temperature for 60 minutes to complete the dyeing. The resulting dyed fabric was finished by washing in a conventional manner. The dyed fabric thus finished had a mottle-free, uniform and deep red color. It showed high color fastnesses to light, to perspiration and daylight, to chlorinated water, to chlorine in running water and to washing. It was stable over a long period of time.

In particular, it exhibited an outstandingly high color fastness to perspiration and daylight and color yield. The highly improved color yield showed the existence of synergistic effect by the blending of the dyes.

EXAMPLE 5

40 Parts of the dye represented by the formula (5) in the free acid form was thoroughly mixed with 960 parts of a dye represented by the formula (13) in the free acid form:

in a conventional manner. The finished dyed fabric had a uniform deep red color. It showed high color fastnesses to light, to perspiration and daylight, to chlorinated water, to chlorine in running water ad to washing. It was stable over a long period of time.

In particular, it exhibited an outstandingly high color fastness to perspiration and daylight and color yield. The highly improved color yield showed the existence of synergistic effect by the blending of the dyes.

EXAMPLE 6

300 Parts of the dye represented by the formula (5) in the free acid form was thoroughly mixed with 700 parts of a dye represented by the formula (14) in the free acid form:

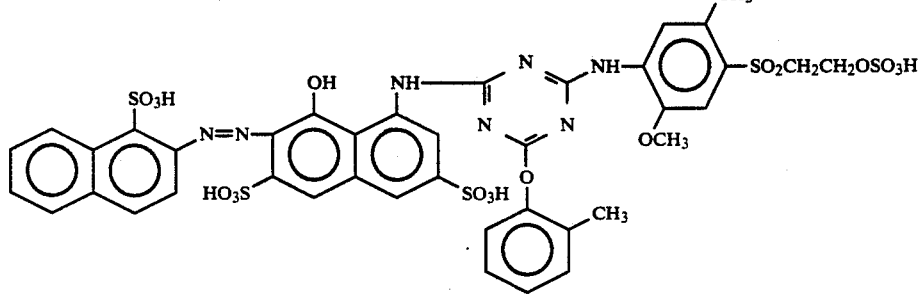

to obtain a dye composition. In hot water was dissolved 20 g of the dye composition thus obtained. The resulting solution was cooled to 25° C. To the cooled solution were added 1 g of sodium alginate, 10 g of sodium m-nitrobenzenesulfonate and 20 g of sodium hydrogencarbonate. Then, the total volume of the resulting solution was made to 1 liter at 25° C. by adding water thereto. Immediately thereafter, padding of a cotton fabric was conducted using the volume-adjusted solution as a padding liquid. After padding, the resulting cotton fabric was dried at 120° C. for 2 minutes and then steamed at 100° C. for 5 minutes to fix the dye. The resulting dyed

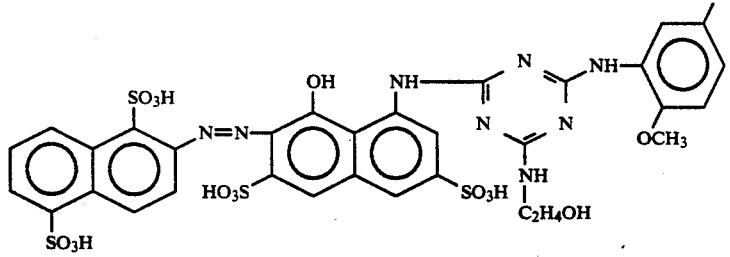

to obtain a dye composition. In hot water was dissolved 30 g of the reactive dye composition thus obtained. The resulting solution was cooled to 25° C. To the cooled solution were added 15 ml of 32.5% aqueous sodium hydroxide solution and 150 g of water glass having a Baumé degree of 50° in a conventional manner. The total volume of the solution was made to 1 liter at 25° C. by adding water thereto. Immediately thereafter, padding of a cotton fabric was conducted using the volume-adjusted solution as a padding liquid. After padding, the resulting cotton fabric was wound up, sealed up in a polyethylene film, and allowed to stand at room temperature (25° C.) for 20 hours. Thereafter, the dyed fabric thus obtained was finished by washing and drying fabric had a uniform deep red color. It showed high color fastnesses to light, to perspiration and daylight, to chlorinated water, to chlorine in running water and to washing. It was stable over a long period of time.

In particular, it exhibited an outstandingly high color fastness to perspiration and daylight and color yield. The highly improved color yield showed the existence of synergistic effect by the blending of the dyes.

EXAMPLE 7

In a wince dyeing apparatus was set 100 kg of a knitted cotton fabric. The bath ratio was adjusted to 1:15 and the water bath temperature to 56° C. 160 Parts of the dye represented by the formula (9) in the free acid form were thoroughly mixed with 640 parts of a dye represented by the formula (15) in the free acid form:

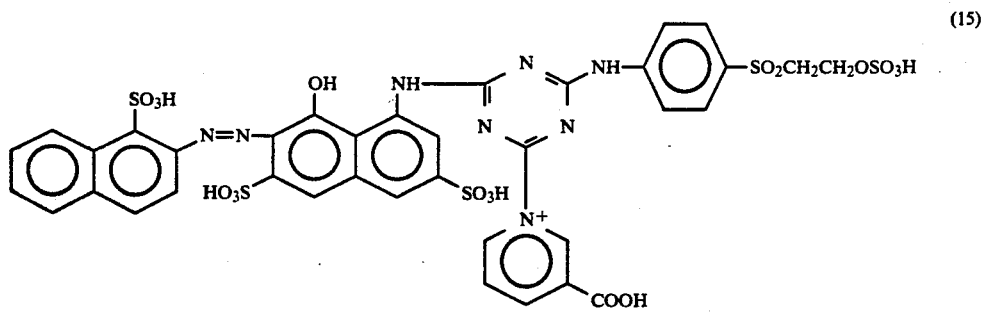

(15)

and 200 parts of sodium salt of a condensation product between methylnaphthalenesulfonic acid and formaldehyde (degree of sulfonation: 110%, average degree of condensation: 1.8) to obtain a dye composition. 3 Kilograms of the resulting dye composition was dissolved in water in a conventional manner. The resulting solution was poured into the bath of the apparatus, and the bath temperature was maintained at 56° C. Then, 50 kg of anhydrous sodium sulfate was put in the bath in a conventional manner. The knitted fabric was treated in the bath at this temperature for 20 minutes. Thereafter, 15 kg of sodium carbonate was put in the bath in a conventional manner. Subsequently, the knitted fabric was treated at the temperature for 60 minutes to complete the dyeing. The resulting dyed fabric was finished by washing in a conventional manner. The dyed fabric thus finished had a uniform and vivid red color. It showed high color fastnesses to light, to perspiration and daylight, to chlorinated water, to chlorine in running water and to washing. It was stable over a long period of time.

In particular, it exhibited an outstandingly high color fastness to perspiration and daylight and color yield. The highly improved color yield showed the existence of synergistic effect by the blending of the dyes.

EXAMPLE 8

In a liquor flow dyeing apparatus was set 100 kg of a knitted cotton fabric. The bath ratio was adjusted to 1:15 and the water bath temperature to 60° C. In the bath of the apparatus were put, in a conventional manner, an aqueous solution of 0.6 kg of a dye represented by the formula (16) in the free acid form:

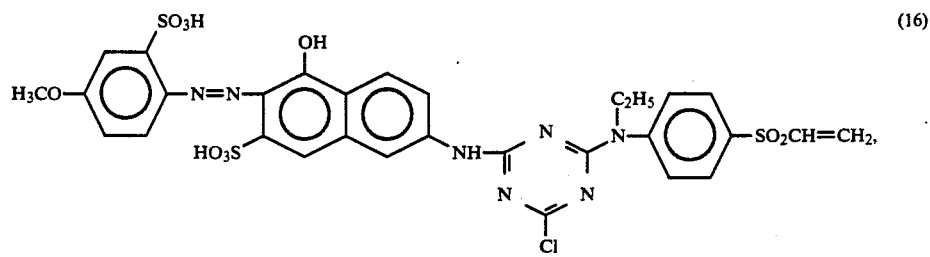

(16)

and an aqueous solution of 5.4 kg of a dye represented by the formula (17) in the free acid form:

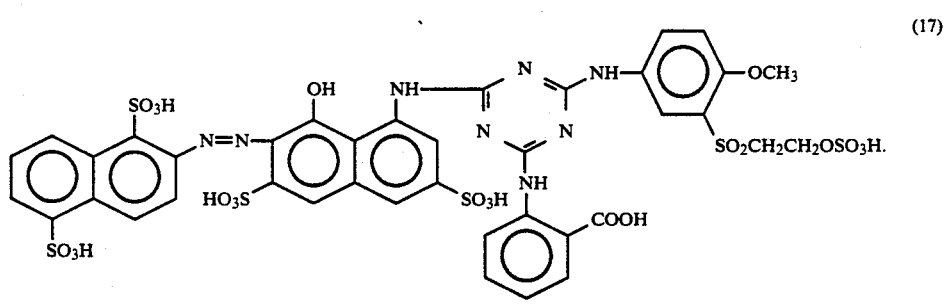

(17)

Then, 150 kg of anhydrous sodium sulfate was put in the bath in two portions in a conventional manner. The knitted fabric was treated in the bath at 60° C. for 20 minutes. Thereafter, 30 kg of sodium carbonate was put in the bath in three portions in a conventional manner. Subsequently, the knitted fabric was treated in the bath at 60° C. for 60 minutes to complete the dyeing. The resulting dyed fabric was finished by washing by a conventional method. The dyed fabric thus finished had a mottle-free, uniform and deep red color. It showed high color fastnesses to light, to perspiration and daylight, to chlorinated water, to chlorine in running water and to washing. It was stable over a long period of time.

In particular, it showed an outstandingly high color fastness to perspiration and daylight and color yield. The highly improved color yield showed the existence of synergistic effect by the blending of the dyes.

EXAMPLE 9

In a cheese dyeing apparatus was set 50 kg of cotton yarn in the form of a cheese. The bath ratio was adjusted to 1:10 and the water bath temperature to 58° C. 200 Parts of a dye represented by the formula (18) in the free acid:

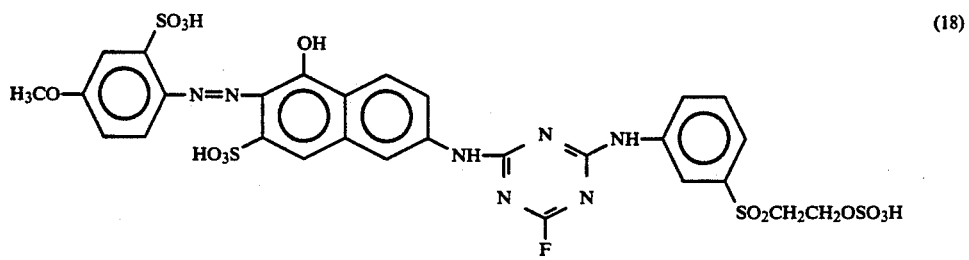

was thoroughly mixed with 800 parts of a dye represented by the formula (19) in the free acid form:

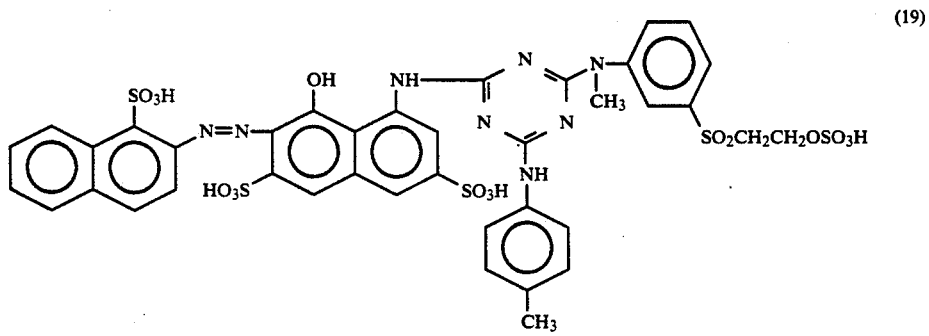

to obtain a dye composition. 5 Kilograms of the dye composition, 1 kg of Remazol Yellow 3R-SN (mfd. by Hoechst AG) and 3 kg of Sumifix Brilliant Blue R special (mfd. by Sumitomo Chemical Co., Ltd.) were dissolved in water in a conventional manner. The resulting solution was poured into the bath of the apparatus and the bath temperature was maintained at 58° C. Then, 40 kg of anhydrous sodium sulfate was put in the bath in a conventional manner. The yarn was treated in the bath at this temperature for 30 minutes. Thereafter, 5 kg of sodium tertiary phosphate was put in the bath in a conventional manner. Subsequently, the yarn was treated at the temperature for 60 minutes to complete the dyeing.

The resulting dyed yarn was finished by washing by a conventional method. The dyed yarn thus finished had a uniform, subdued and deep purple color without any difference in depth of color between the inside and outside layers of the cheese. It showed high color fastnesses to light, to perspiration and daylight, to chlorinated water, to chlorine in running water and to washing. It was stable over a long period of time.

In particular, it exhibited an outstandingly high color fastness to perspiration and daylight and color yield. The highly improved color yield showed the existence of synergistic effect by the blending of the dyes.

EXAMPLE 10

150 Parts of the dye represented by the formula (5 in the free acid form was thoroughly mixed with 850 parts of a dye represented by the formula (20) in the free acid:

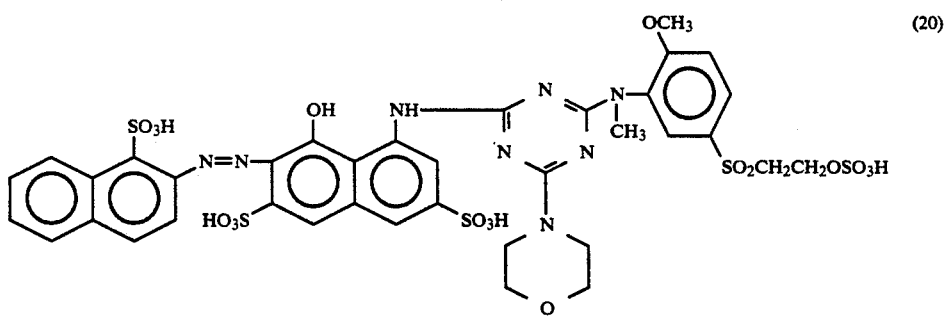

to obtain a dye composition. In hot water were dissolved 20 g of the resulting dye composition, 20 g of a yellow dye represented by the formula (21) in the free acid form:

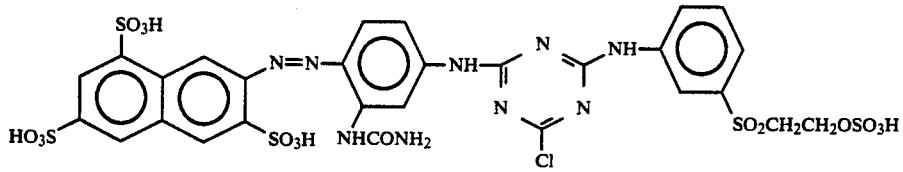

(21)

and 10 g of a blue dye represented by the formula (22) in the free acid:

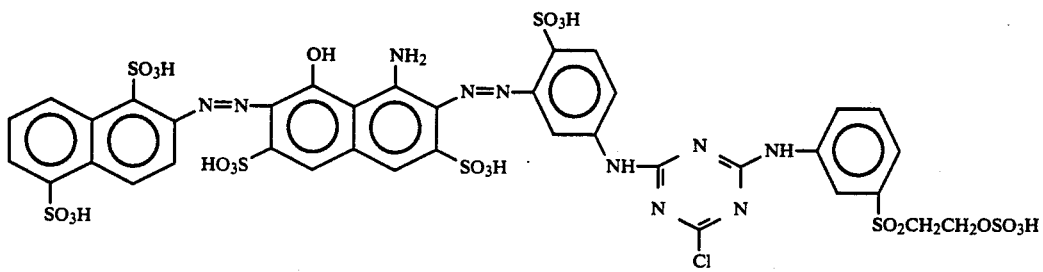

(22)

The resulting solution was cooled to 25° C. To the dye solution were added 1 g of sodium alginate, 10 g of sodium m-nitrobenzenesulfonate and 20 g of sodium hydrogencarbonate. Then, the total volume of the solution was made to 1 liter at 25° C. by adding water thereto. Immediately thereafter, padding of a cotton fabric was conducted using the volume-adjusted solution as a padding liquid. After padding, the cotton fabric was dried at 120° C. for 2 minutes and then steamed at 100° C. for 5 minutes to fix the dye. The resulting dyed fabric had a uniform brown color. It showed high color fastnesses to light, to perspiration and daylight, to chlorinated water, chlorine in running water and to washing. It was stable over a long period of time.

In particular, it exhibited an outstandingly high color fastness to perspiration and daylight and color yield. The highly improved color yield showed the existence of synergistic effect by the blending of the dyes.

EXAMPLE 11

200 Parts of the dye represented by the formula (5) in the free acid form was thoroughly mixed with 800 parts of a dye represented by the formula (23) in the free acid form:

to obtain a dye composition. In hot water was dissolved 50 g of the dye composition thus obtained. The resulting solution was cooled to 25° C. To the cooled solution were added 30 g of anhydrous sodium sulfate and 18 ml of a 32.5% aqueous sodium hydroxide solution. Then, the volume of the solution was made to 1 liter at 25° C. by adding water thereto. Immediately thereafter, padding of a cotton fabric was conducted using the volume-adjusted solution as a padding liquid. After padding, the cotton fabric was wound up, sealed up in a polyethylene film, and allowed to stand at room temperature (25° C.) for 20 hours. Thereafter, the dyed fabric thus obtained was finished by washing and drying by a conventional method. The finished dyed fabric had a uniform deep red color. It showed high color fastnesses to light, to perspiration and daylight, to chlorinated water, to chlorine in running water and to washing. It was stable over a long period of time.

In particular, it exhibited an outstandingly high color fastness to perspiration and daylight and color yield. The highly improved color yield showed the existence of synergistic effect by the blending of the dyes.

EXAMPLE 12

100 Parts of the dye represented by the formula (5) in the free acid form was thoroughly mixed with 900 parts of a dye represented by the formula (24) in the free acid form:

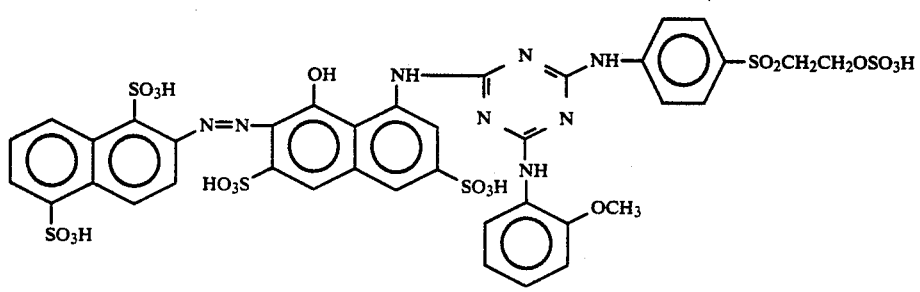

(23)

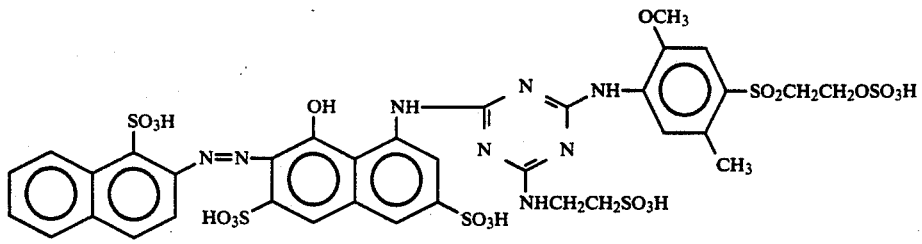

(24)

to obtain a dye composition. Using the dye composition, a printing paste was produced according to the following recipe.

| The dye composition | 80 g |
|---|---|
| Urea | 50 g |
| Sodium alginate | 550 g |
| Hot water | 300 g |
| Sodium hydrogencarbonate | 20 g |
| Total | 1,000 g |

The printing paste obtained was printed on a cotton broad cloth (yarn number count: 40) by a conventional method, followed by steaming at 100° C. for 5 minutes. Thereafter, the thus treated cotton broad cloth was finished by water washing, hot water washing, soaping, hot water washing, water washing, and then drying. The finished cotton broad cloth had a uniform deep red color. It showed high color fastnesses to light, to perspiration and daylight, to chlorinated water, to chlorine in running water and to washing. It was stable over a long period of time.

In particular, it exhibited an outstandingly high color fastness to perspiration and daylight and color yield. The highly improved color yield showed the existence of synergistic effect by the blending of the dyes.

EXAMPLES 13 TO 25

Dyeing and textile printing were carried out by repeating the same procedure as in Examples 1 to 12 with the reactive dye compositions shown in Tables 7 to 11. The use of the reactive dye compositions gave industrially useful dyed or printed products, which had a uniform, mottle-free and sufficiently deep color. The dyed or printed products obtained were stable over a long period of time and showed high color fastnesses to light, to perspiration and daylight, to chlorinated water, to chlorine in running water and to washing.

Each of the reactive dye compositions, in which the dyes listed in the tables were used in combination, gave a dyed or printed product having a much higher color yield than the value obtained by arithmetically averaging the color yields of the products dyed or printed with each of the dyes contained therein by the same dyeing or printing method. The highly improved color yield of the dyed or printed product by the use of the reactive dye compositions showed the existence of synergistic effect by the combined use of the dyes.

TABLE 7

| Example | Compound | Parts |
|---|---|---|
| 13 | [structure with SO₃H, OH, H₃CO, N=N, HO₃S, NH, C₂H₅, N, Cl, SO₂CH₂CH₂OSO₃H] | 8 |
| | [structure with SO₃H, OH, NH, N=N, HO₃S, SO₃H, NH, N, NH, SO₂CH₂CH₂OSO₃H, COOH] (25) | 92 |

TABLE 7-continued

| Example | Compound | Parts |
|---------|----------|-------|
| 14 | [structure: H3CO-phenyl(SO3H)-N=N-naphthyl(OH)(SO3H)-NH-triazine(Cl)-N(C2H5)-phenyl-SO2CH2CH2OSO3H] | 15 |
|  | [structure (26): naphthyl(SO3H)(SO3H)-N=N-naphthyl(OH)(SO3H)(SO3H)-NH-triazine(NHC2H4SO3H)-NH-phenyl(OCH3)-SO2CH2CH2OSO3H] | 85 |
| 15 | [structure: H3CO-phenyl(SO3H)-N=N-naphthyl(OH)(SO3H)-NH-triazine(Cl)-NH-phenyl(OCH3)(CH3)-SO2CH2CH2OSO3H] | 20 |
|  | [structure (27): naphthyl(SO3H)(SO3H)-N=N-naphthyl(OH)(NH2)(SO3H)(SO3H)-NH-triazine(O-tolyl)-NH-phenyl(OCH3)-SO2CH2CH2OSO3H] | 80 |

TABLE 8

| Example | Compound | Parts |
|---------|----------|-------|
| 16 | [structure: H3CO-phenyl(SO3H)-N=N-naphthyl(OH)(SO3H)-NH-triazine(Cl)-N(C2H5)-phenyl-SO2CH2CH2OSO3H] | 5 |

TABLE 8-continued

| Example | Compound | Parts |
|---|---|---|
|  | (28) Structure: 2-naphthalenesulfonic acid azo-coupled to 1-hydroxy-naphthalene-3,6-disulfonic acid with 8-NH linked to triazine bearing NH-(4-methylphenyl) and NH-(3-SO₂CH₂CH₂OSO₃H-phenyl) substituents | 95 |
| 17 | (structure with H₃CO-, SO₃H, OH, HO₃S-naphthalene-NH-triazine(Cl)(N(C₂H₅)-phenyl-SO₂CH₂CH₂OSO₃H)) | 10 |
|  | (29) Structure: naphthalenesulfonic acid azo-coupled to hydroxy-naphthalene-disulfonic acid with NH-triazine bearing NH-(2-methoxy-5-SO₂CH₂CH₂OSO₃H-phenyl) and N(C₂H₄OH)₂ substituents | 85 |
|  | (30) Structure: naphthalenesulfonic acid azo-coupled to hydroxy-naphthalene-disulfonic acid with NH-triazine bearing NH-(2-methoxy-5-SO₂CH=CH₂-phenyl) and N(C₂H₄OH)₂ substituents | 5 |

TABLE 9

| Example | Compound | Parts |
|---|---|---|
| 18 | Structure: H₃CO-, SO₃H-phenyl-N=N-hydroxy-naphthalene-SO₃H-NH-triazine(Cl)(N(C₂H₅)-phenyl-SO₂CH=CH₂) | 30 |

TABLE 9-continued

| Example | Compound | Parts |
|---|---|---|
| | Structure (31): 2-[(1,5-disulfonaphthalen-2-yl)azo]-1-hydroxy-3-sulfo-8-[[4-[[3-(vinylsulfonyl)phenyl]amino]-6-(piperidin-1-yl)-1,3,5-triazin-2-yl]amino]naphthalene-6-sulfonic acid | 70 |
| 19 | Structure: H₃CO-phenyl(SO₃H)-N=N-[hydroxy-sulfo-naphthyl]-NH-[triazine(Cl)(N(CH₃)-phenyl-SO₂CH₂CH₂OSO₃H)] | 27 |
| | Structure (32): [(1-sulfonaphthalen-2-yl)azo]-hydroxy-sulfo-naphthalene-SO₃H-NH-triazine bis[NH-(3-SO₂CH₂CH₂OSO₃H-phenyl) and NH-(3-SO₃H-phenyl)] | 63 |
| | Structure (33): analogous with SO₂CH=CH₂ and SO₃H substituents | 10 |

TABLE 10

| Example | Compound | Parts |
|---|---|---|
| 20 | H₃CO-phenyl(SO₃H)-N=N-[hydroxy-sulfo-naphthyl]-NH-[triazine(Cl)(N(C₂H₅)-(4-OCH₃-phenyl)-SO₂CH₂CH₂OSO₃H)] | 7 |

TABLE 10-continued

| Example | Compound | Parts |
|---|---|---|
| | (34) structure | 93 |
| 21 | structure | 19 |
| | (35) structure | 81 |
| 22 | structure | 14 |
| | (36) structure | 86 |

TABLE 11

| Example | Compound | Parts |
|---------|----------|-------|
| 23 | Structure with 2-methoxy-5-sulfophenyl-azo-naphthol bearing SO₃H, linked via NH to a triazine substituted with Cl and N(C₂H₅)-phenyl-SO₂CH₂CH₂OSO₃H | 35 |
|  | Structure (37): naphthalene-sulfonic acid azo-coupled to dihydroxy/disulfo-naphthalene with NH-triazine bearing NH-phenyl-SO₂CH₂CH₂OSO₃H and N⁺-pyridinium-COOH | 65 |
| 24 | Structure with 2-methoxy-5-sulfophenyl-azo-naphthol bearing SO₃H, linked via NH to a triazine substituted with Cl and N(C₂H₅)-phenyl-SO₂CH₂CH₂OSO₃H | 5 |
|  | Structure (38): 1,5-disulfo-naphthalene azo-coupled to hydroxy-disulfo-naphthalene with NH-triazine bearing NH-phenyl-SO₂CH₂CH₂OSO₃H and NHCH₂CH₂CH₃ | 95 |
| 25 | Structure with 2-methoxy-5-sulfophenyl-azo-naphthol bearing SO₃H, linked via NH to a triazine substituted with Cl and N(CH₃)-phenyl-SO₂CH=CH₂ | 15 |

TABLE 11-continued

| Example | Compound | Parts |
|---------|----------|-------|
| |  (39) | 85 |

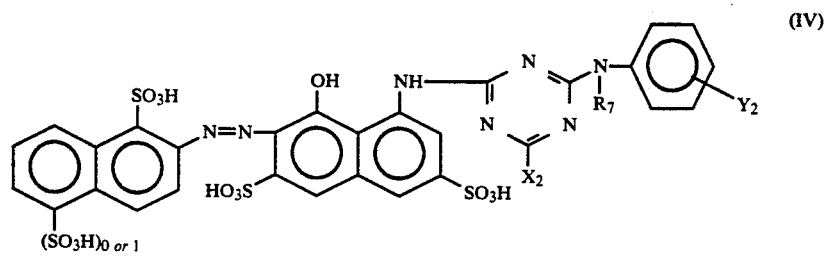

What is claimed is:

1. A reactive dye composition which comprises:
at least one dye selected from the dyes represented by the formula (I) in the free acid form:

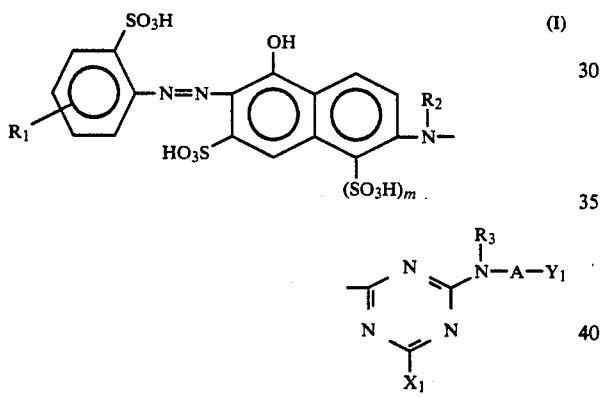

wherein m is zero or 1; $R_1$ is hydrogen, lower alkyl or lower alkoxy; $R_2$ and $R_3$ are independently hydrogen or lower alkyl unsubstituted or substituted by hydroxyl, cyano, alkoxy, carboxy, carbamoyl, alkoxycarbonyl, alkylcarbonyloxy, sulfo, sulfamoyl or halogen; A is phenylene unsubstituted or substituted by one or two substituents selected from the group consisting of lower alkyl, lower alkoxy, sulfo and halogen, naphthylene or sulfonaphthylene; $X_1$ is halogen, $-N(R_4)R_5$ or $-OR_6$ in which $R_4$, $R_5$ and $R_6$ are independently hydrogen, alkyl unsubstituted or substituted by hydroxyl, cyano, alkoxy, carboxy, carbamoyl, alkoxycarbonyl, alkylcarbonyloxy, sulfo, sulfamoyl or halogen, phenyl unsubstituted or substituted by hydroxyl, cyano, alkoxy, carboxy, carbamoyl, alkoxycarbonyl, alkylcarbonyloxy, sulfo, sulfamoyl or halogen or naphthyl unsubstituted or substituted by hydroxyl, cyano, alkoxy, carboxy, carbamoyl, alkoxycarbonyl, alkylcarbonyloxy, sulfo, sulfamoyl or halogen; and $Y_1$ is the group $-SO_2CH=CH_2$ or the group $-SO_2CH_2CH_2Z_1$ in which $Z_1$ is a group splittable by the action of an alkali, and at least one dye selected from the dyes represented by the formula (II) in the free acid form;

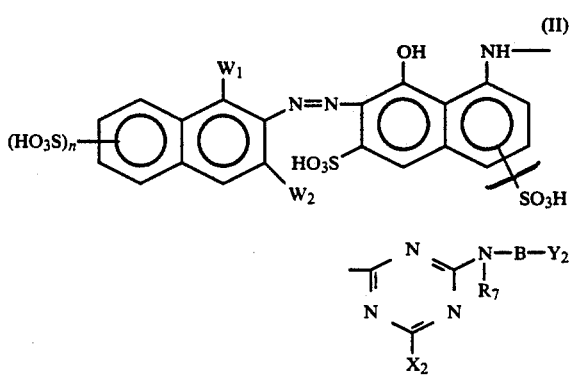

wherein n is zero, 1 or 2; one of $W_1$ and $W_2$ is hydrogen and the other is sulfo; $R_7$ is hydrogen or lower alkyl unsubstituted or substituted by hydroxyl, cyano, alkoxy, carboxy, carbamoyl, alkoxycarbonyl, alkylcarbonyloxy, sulfo, sulfamoyl or halogen; B is phenylene unsubstituted or substituted by one or two substituents selected from the group consisting of lower alkyl, lower alkoxy, sulfo and halogen, naphthylene or sulfonaphthylene; $X_2$ is $-N(R_8)R_9$, $-OR_{10}$ in which $R_8$, $R_9$ and $R_{10}$ are independently hydrogen, alkyl unsubstituted or substituted by hydroxyl, cyano, alkoxy, carboxy, carbamoyl, alkoxycarbonyl, alkylcarbonyloxy, sulfo, sulfamoyl or halogen, phenyl unsubstituted or substituted by hydroxyl, cyano, alkoxy, carboxy, carbamoyl, alkoxycarbonyl, alkylcarbonyloxy, sulfo, sulfamoyl or halogen, naphthyl unsubstituted or substituted by hydroxyl, cyano, alkoxy, carboxy, carbamoyl, alkoxycarbonyl, alkylcarbonyloxy, sulfo, sulfamoyl or halogen, substituted or unsubstituted pyridinio, substituted or unsubstituted morpholino, or substituted or unsubstituted piperidino; and $Y_2$ is the group $-SO_2CH=CH_2$ or the group $-SO_2CH_2CH_2Z_2$ in which $Z_2$ is a group splittable by the action of an alkali.

2. The reactive dye composition of claim 1, wherein the amount of at least one dye selected from those represented by the formula (II) is 0.05 to 100 times by weight the amount of at least one dye selected from those represented by the formula (I).

3. The reactive dye composition of claim 1, wherein at least one dye selected from those represented by the formula (I) is represented by the formula (III) in the free acid form:

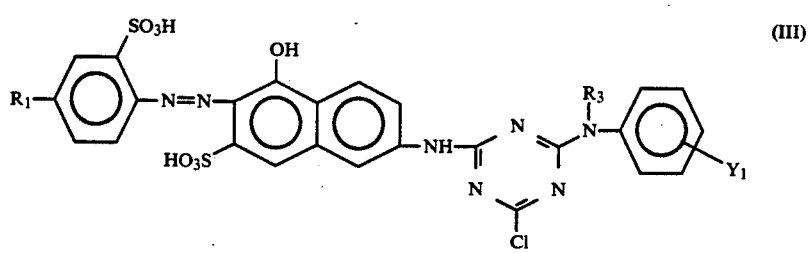

wherein $R_1$, $R_3$ and $Y_1$ are as defined in claim 1.

4. The reactive dye composition of claim 3, wherein the dye is one having lower alkoxy as $R_1$ and hydrogen, methyl or ethyl as $R_3$.

5. The reactive dye composition of claim 1, wherein at least one dye selected from those represented by the formula (II) is represented by the formula (IV) in the free acid form:

wherein $R_7$, $X_2$ and $Y_2$ are as defined in claim 1.

6. The reactive dye composition of claim 5, wherein the dye is one having hydrogen, methyl or ethyl as $R_7$ and morpholino or piperidino as $X_2$.

7. A method for dyeing or printing a cellulose fiber material or a fiber material containing a cellulose fiber, which comprises using the reactive dye composition of claim 1.